United States Patent
Lanier

[11] 3,844,748
[45] Oct. 29, 1974

[54] HYDRO-FILTRATION APPARATUS
[75] Inventor: Theodore Lanier, Bronx, N.Y.
[73] Assignee: The Raymond Lee Organization, Inc., New York, N.Y. ; a part interest
[22] Filed: Dec. 8, 1972
[21] Appl. No.: 313,343

[52] U.S. Cl.............. 55/255, 55/DIG. 30, 55/259
[51] Int. Cl............................................ B01d 53/04
[58] Field of Search ...... 55/DIG. 30, 257, 259, 316, 55/321, 322, 255; 261/121–123

[56] References Cited
UNITED STATES PATENTS
| | | | |
|---|---|---|---|
| 3,406,501 | 10/1968 | Watkins | 55/316 |
| 3,476,524 | 11/1969 | Burke | 55/316 |
| 3,642,259 | 2/1972 | Bowden | 55/259 |
| 3,695,005 | 10/1972 | Yuzawa | 55/259 |

Primary Examiner—Charles N. Hart
Attorney, Agent, or Firm—Howard I. Podell

[57] ABSTRACT

Apparatus for the filtering of exhaust fumes from smoke stacks of furnaces and incinerators, in which the exhaust fumes are drawn through a tank containing a liquid and then drawn through wire screens and an activated charcoal bed by a motorized blower.

The apparatus consists of the intake ducts, filtering tanks, filtering screens and charcoal bed, exhaust ducting and exhaust fan, together with the accessory apparatus which permits flushing of the liquid filtering tank and removal and replacement of the filtering screens and charcoal.

1 Claim, 1 Drawing Figure

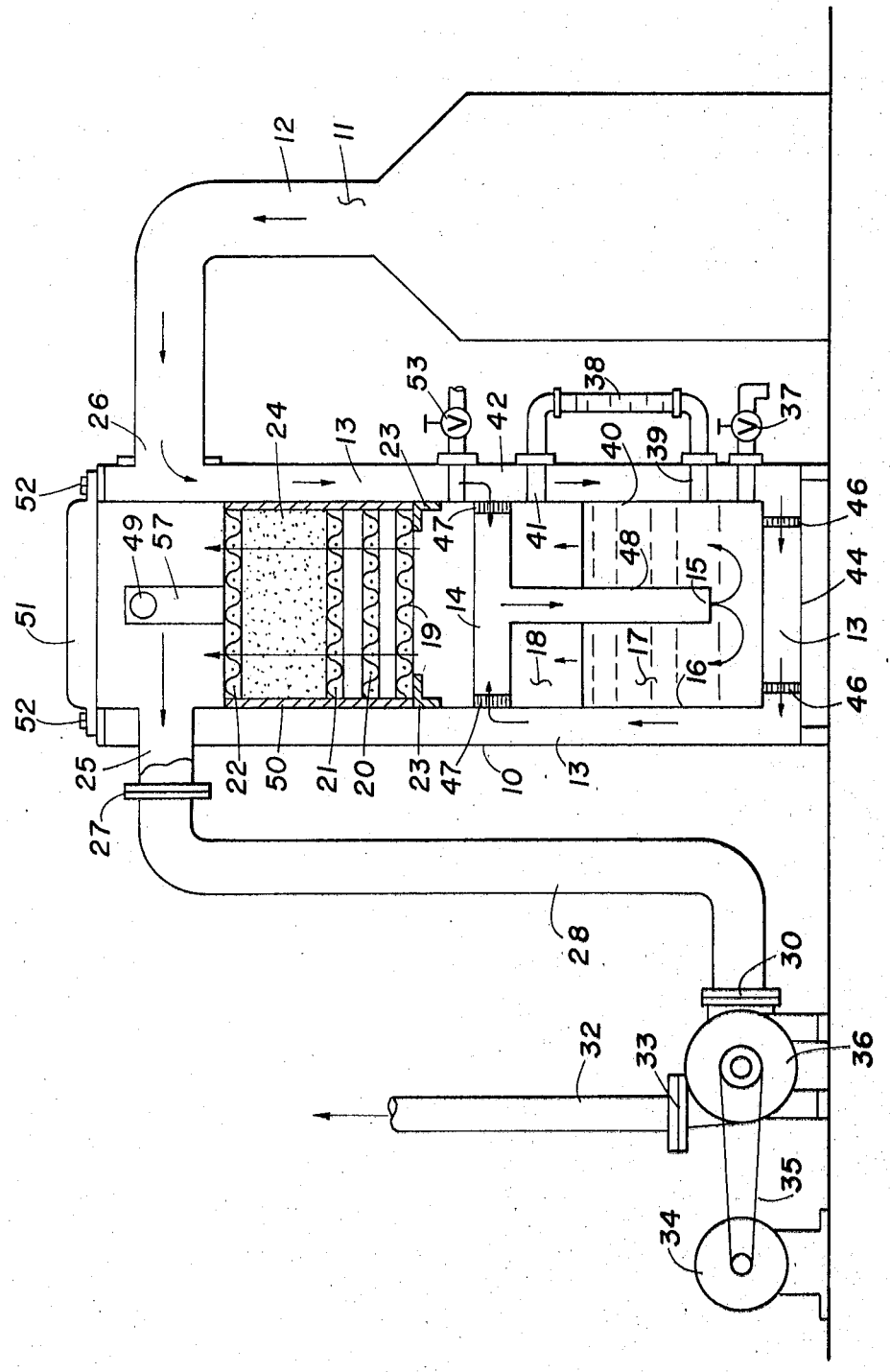

3,844,748

HYDRO-FILTRATION APPARATUS

SUMMARY OF THE INVENTION

This invention relates to an apparatus for the filtering of exhaust fumes, and particularly to an apparatus which can clean the smoke emitted by the smoke stacks of furnaces and incinerators.

The advantage of this apparatus is that it may be readily attached to the exhaust flue of furnaces and incinerators with consequent elimination of harmful pollution of the atmosphere. The apparatus removes both solid particles and chemicals in the exhaust which are soluble in the liquid wash through which the exhaust is passed.

The apparatus consists of a wash tank containing wash liquids through which the exhaust is passed, and a series of wire filtering screens and an activated charcoal bed, together with an exhaust fan for drawing the smoke through the apparatus from the smoke stack or flue of the burner and apparatus, together with the necessary associated ducting and valving required. The wash tank may be readily flushed, and the screen filters and charcoal bed may be readily replaced, as required.

BRIEF DESCRIPTION OF THE DRAWINGS

The objects and features of the invention may be understood with reference to the following detailed description of an illustrative embodiment of the invention, taken together with the accompanying drawings which is in the form of a sectional elevation view of the apparatus.

DESCRIPTION OF THE PREFERRED EMBODIMENT

Turning now descriptively to the drawing, in which similar reference characters denote similar elements throughout the view, the drawing depicts the hydrofiltration apparatus 10, the intake duct 26 of which is joined to a flue or smokestack 12 which is emitting smoke or noxious fumes 11.

Exhaust fan 36 is driven by belt 35 powered by motor 34 to draw the emitted fumes 12 through the apparatus 10.

The filtration unit of the apparatus is in cylindrical form and a liquid tank 16 which is partially filled with water or with a chemical 17 which dissolves the exhaust by-products. Above the wash tank 16 is mounted filtering screens 19, 20 and 21, an activated charcoal bed 24 and a filtering screen 22.

The cylindrical filtration unit 40 is surrounded by the hollow intake section 13 joined to the intake duct 26, intake section 13 being enclosed by the housing 42 of the apparatus. The filtration unit 40 may be supported above the base 44 of the housing by perforated base mounts 46 to permit the incoming fumes to flow about and below the wash tank 16 and to enter the perforated intake openings 47 mounted on both sides of the wash tank 16. Tank intake openings 47 are joined to a vertical duct 48 which leads to a common outlet 15 below the level of the chemical 17 in wash tank 16, through which the exhaust fumes 11 are drawn into the liquid 17 of the wash tank 16.

The washed fumes 18 rise above the level of the liquid chemical 17 in the wash tank 16 and are drawn through wire screens 19, 20 and 21 which are fastened to the internal wall of tube 50. Tube 50 is supported by brackets 23 mounted on the walls of the interior of the filtration unit 40. Screen 20 is fitted with finer openings than those of screen 19 below, and screen 21 is fitted with finer openings than those of screen 20. The fumes are then drawn through a bed of activated charcoal 24 which is supported on screen 21 and capped by upper screen 22. Screen 22 is fastened to filter tube 50, and filter tube 50 is fastened to a vertical tongue member 57 in which a hole 49 is fitted for the purpose of lifting out filter tube 50 and attached screens 19, 20, 21 and 22 and the bed of charcoal 24. Top cap 51 may be removed for this latter purpose. Top cap 51 is held in place by bolts 52 which may be removed, when it is desired to clean or replace the screens and bed of charcoal.

The outlet 25 of the filtration unit 40 is joined by a flanged sections of piping to the exhaust pipe 28 which leads to the intake duct 30 of the exhaust fan 36. The exhaust duct 33 of the exhaust fan 36 is joined by flanges to the exhaust pipe 32 of the system, which may be oriented in a vertical upward direction so as to utilize the heat of the filtered exhaust fumes in flowing out of the exhaust pipe 32.

It is to be noted that wash tank 16 is heated both by the action of the incoming exhaust fumes 11 in the intake section 13 which surrounds the wash tank, and by the action of the exhaust fumes flowing into the wash tank. Consequently, the activity of the chemical solution 17 in the wash tank 16 is increased, particularly with regard to the retaining in the wash solution of the pollutant chemicals in the incoming exhaust fumes 11.

Wash tank 16 is joined by piping 39 located below the normal liquid level of the tank and by piping 41 located above the normal liquid level in the wash tank to a water level indicator 38. Drain valve 37 is joined to the wash tank 16 near the bottom of said tank, and intake valve 57 is joined to the wash tank 16 located above the normal liquid level of the tank.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. Apparatus for the filtering and dissolving of impurities in the exhaust fumes of a furnace or incinerator, comprising a wash tank which is adaptable for containing a liquid wash solution, with piping to lead the exhaust fumes into the wash tank below the normal level of the wash solution, together with a filtering screen mounted above the normal liquid level of the wash solution in the wash tank, and mounted to the housing which projects above the wash tank so as to filter all exhaust fumes which flow out of the wash tank, and a bed of charcoal supported on said filtering screen and supported by the said housing so as to filter all exhaust fumes which have flowed through said filter screen, together with piping connected to the housing above the location of the top of the charcoal bed, which piping leads to an exhaust blower driven by a motor which draws the exhaust fumes through the apparatus and exhausts the washed and cleaned exhaust fumes to an exhaust duct, with the filtration section of the apparatus, comprising the filtering screens and the charcoal bed, fastened together inside the said housing such that the filtration section may be removed from the housing for cleaning and replacement purposes, in which two or more filtering screens are mounted below the intake section of the charcoal bed and between the charcoal bed and the wash tank, and in which a filtering screen is mounted above the exhaust section of the charcoal bed so as to retain the charcoal from being drawn into the exhaust blower intake piping, in which the sides and bottom of the wash tank are surrounded by the hollow intake section of the apparatus, with said intake section connected by ducting to the exhaust flue of the furnace or incinerator and to the piping which leads the exhaust fumes into the wash tank, so that the wash solution contained in the wash tank is heated by the incoming exhaust fumes for the purpose of increasing the ability of the wash solution to dissolve, and retain in solution, chemicals contained in the incoming exhaust fumes.

* * * * *